(12) United States Patent
Li et al.

(10) Patent No.: US 11,755,119 B2
(45) Date of Patent: Sep. 12, 2023

(54) SCENE CONTROLLING METHOD, DEVICE AND ELECTRONIC EQUIPMENT

(71) Applicant: BEIJING MICROLIVE VISION TECHNOLOGY CO., LTD, Beijing (CN)

(72) Inventors: Xugang Li, Beijing (CN); Yufei Feng, Beijing (CN); Yangguang Liu, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/769,368

(22) PCT Filed: Jan. 25, 2019

(86) PCT No.: PCT/CN2019/073076
§ 371 (c)(1),
(2) Date: Jun. 3, 2020

(87) PCT Pub. No.: WO2020/001015
PCT Pub. Date: Jan. 2, 2020

(65) Prior Publication Data
US 2020/0311398 A1    Oct. 1, 2020

(30) Foreign Application Priority Data

Jun. 29, 2018   (CN) ............................ 20181069906.9

(51) Int. Cl.
*G06F 3/00* (2006.01)
*G06V 40/20* (2022.01)
*G06F 3/01* (2006.01)

(52) U.S. Cl.
CPC .............. *G06F 3/017* (2013.01); *G06V 40/28* (2022.01)

(58) Field of Classification Search
CPC ....... G06K 9/00355; G06K 9/46; G06F 3/017
See application file for complete search history.

(56) References Cited

U.S. PATENT DOCUMENTS

| 2011/0129124 A1 | 6/2011 | Givon |
| 2012/0087543 A1 | 4/2012 | Choi et al. |

(Continued)

FOREIGN PATENT DOCUMENTS

| CN | 102226880 A | 10/2011 |
| CN | 103019378 A | 4/2013 |

(Continued)

OTHER PUBLICATIONS

International Patent Application No. PCT/CN2019/073076; Int'l Search Report; dated Apr. 24, 2019; 2 pages.

*Primary Examiner* — Wing H Chow
(74) *Attorney, Agent, or Firm* — BakerHostetler (57) ABSTRACT

A scene controlling method, a device and electronic equipment are provided, which relate to the field of scene controlling. The scene controlling method includes displaying a scene in a first modality, recognizing a trigger object, determining a motion of the trigger object, and switching the scene from the first modality to a second modality based on the motion. The first modality of the scene is associated with the second modality of the scene. Predetermined scene information is retrieved based on the motion of the trigger object so as to switch between scenes or control an element in the scene. By associating the motions of the trigger object with the scenes, the scene displayed on the electronic equipment can be controlled without any hardware upgrade of the conventional electronic equipment, thereby reducing the cost.

11 Claims, 6 Drawing Sheets

(56) References Cited

U.S. PATENT DOCUMENTS

| | | | |
|---|---|---|---|
| 2013/0265220 A1 | 10/2013 | Fleischmann et al. | |
| 2013/0271360 A1 | 10/2013 | Macdougall et al. | |
| 2017/0287222 A1 | 10/2017 | Fujimaki | |
| 2017/0293364 A1* | 10/2017 | Wang | G06F 3/017 |
| 2018/0107282 A1* | 4/2018 | Jeon | G06F 3/0483 |

FOREIGN PATENT DOCUMENTS

| | | | |
|---|---|---|---|
| CN | 103383598 | A | 11/2013 |
| CN | 103530613 | A | 1/2014 |
| CN | 205304923 | U | 6/2016 |
| CN | 107589846 | A | 1/2018 |
| CN | 108989553 | A | 12/2018 |
| CN | 109313499 | A | 2/2019 |
| JP | 2013-037499 | A | 2/2013 |
| JP | 2013-235588 | A | 11/2013 |
| JP | 2014-501011 | A | 1/2014 |
| JP | 2014-235698 | A | 12/2014 |
| JP | 2016-218899 | A | 12/2016 |
| JP | 2018-084886 | A | 5/2018 |
| WO | WO 2016/168047 | A1 | 10/2016 |
| WO | WO 2017/211740 | A1 | 12/2017 |

\* cited by examiner

SCENE CONTROLLING METHOD, DEVICE AND ELECTRONIC EQUIPMENT

The present application is the national phase application of International Patent Application No. PCT/CN2019/073076, filed on Jan. 25, 2019, which claims priority to Chinese Patent Application No. 201810699063.9, titled "SCENE CONTROLLING METHOD, DEVICE AND ELECTRONIC EQUIPMENT," filed on Jun. 29, 2018, both of which are incorporated herein by reference in their entireties.

FIELD

The present disclosure relates to the field of image processing, and in particular to a scene controlling method, a scene controlling device and electronic equipment.

BACKGROUND

With the rapid development of human-computer interaction techniques, gestures, as a natural and intuitional manner of communication, play an important role in human-computer interaction. With the rapid development of science and technology and the growing popularity of computer vision technology, people require more natural human-computer interaction methods. Since conventional interactive methods based on a mouse or a keyboard show limitations, new sorts of human-computer interaction methods are increasingly developed. Furthermore, gesture control is an efficient way of human-computer interaction and equipment controlling. Vision-based gesture recognition is a challenging subject in the field of human-computer interaction and pattern recognition.

The present gesture recognition systems usually use (1) data gloves or wearable products and (2) 3D depth cameras.

By using the data gloves or wearable products, the complexity of detection and recognition algorithm can be reduced, but the requirement of wearing cannot meet the demand for natural human-computer interaction.

The 3D depth cameras are difficult to be integrated to popular intelligent terminal due to its large volume, high cost of hardware and high demand for computing capacity.

SUMMARY

In the conventional technology, scene control is mainly based on specific complicated devices. While in practical applications, such as a live webcast using a smartphone, normally no complicated device is installed on the smartphone for its portability. Moreover, scene control in the conventional technology normally relates to changing a view angle to interact with an object in a scene. However, the modality of the scene or the modality of an object in the scene cannot be controlled.

In view of above, a scene controlling method, a scene controlling device and electronic equipment are provided to at least partially solve the problems existing in the conventional technology.

In a first aspect of the present disclosure, a scene controlling method is provided, which includes displaying a scene in a first modality, recognizing a trigger object, determining a motion of the trigger object and switching the scene from the first modality to a second modality based on the motions, where the first modality of the scene is associated with the second modality of the scene.

As a specific implementation of embodiments of the present disclosure, the recognizing a trigger object includes acquiring feature information of the trigger object, comparing the feature information with standard feature information and recognizing the trigger object based on a comparison result.

As a specific implementation of embodiments of the present disclosure, the acquiring feature information of the trigger object includes acquiring key points of the trigger object in detail.

As a specific implementation of embodiments of the present disclosure, the determining a motion of the trigger object includes acquiring first feature information of the trigger object, acquiring second feature information of the trigger object and determining the motion of the trigger object based on the first feature information and the second feature information.

As a specific implementation of embodiments of the present disclosure, the determining a motion of the trigger object includes acquiring an area of the trigger object; and determining the motion of the trigger object based on the area of the trigger object.

As a specific implementation of embodiments of the present disclosure, the determining a motion of the trigger object includes acquiring a first area of the trigger object, acquiring a second area of the trigger object and determining the motion of the trigger object based on a result of comparison between the first area and the second area.

As a specific implementation of embodiments of the present disclosure, the acquiring an area of the trigger object includes determining a smallest regular box fully containing the trigger object, and calculating an area of the smallest regular box to obtain the area of the trigger object.

As a specific implementation of embodiments of the present disclosure, the trigger object is a hand.

As a specific implementation of embodiments of the present disclosure, the motion includes opening and closing, rotating, proximal-distal moving, or gesture changing.

In a second aspect of the present disclosure, a scene controlling device is provided, which includes a display module, a recognition module, a determining module and a controlling module.

The display module is configured to display a scene in a first modality. The recognition module is configured to recognize a trigger object. The determining module is configured to determine a motion of the trigger object. The controlling module is configured to switch the scene from the first modality to the second modality based on the motion of the trigger object, where the first modality of the scene is associated with the second modality of the scene.

As a specific implementation of embodiments of the present disclosure, the recognition module includes a feature information acquisition module configured to acquire the feature information of the trigger object, a comparison module configured to compare the feature information with the standard feature information and a trigger object determining module configured to recognize the trigger object based on a comparison result.

As a specific implementation of embodiments of the present disclosure, the acquiring the feature information of the trigger object includes acquiring key points of the trigger object.

As a specific implementation of embodiments of the present disclosure, the determining module includes a first feature information acquisition module, a second feature information acquisition module and a first motion determining module. The first feature information acquisition module is configured to acquire first feature information of the trigger object. The second feature information acquisition module is configured to acquire second feature information of the trigger object. The first motion determining module is configured to determine the motion of the trigger object based on the first feature information and the second feature information.

As a specific implementation of embodiments of the present disclosure, the determining module includes an area acquisition module configured to acquire an area of the trigger object.

As a specific implementation of embodiments of the present disclosure, the determining module includes a first area acquisition module, a second area acquisition module and a second motion determining module. The first area acquisition module is configured to acquire a first area of the trigger object. The second area acquisition module is configured to acquire a second area of the trigger object. The second motion determining module is configured to determine the motion of the trigger object based on a result of comparison between the first area and the second area.

As a specific implementation of embodiments of the present disclosure, the area acquisition module includes a regular box determining module and an area calculating module. The regular box determining module is configured to determine a smallest regular box fully containing the trigger object. The area calculating module is configured to calculate an area of the smallest regular box to obtain the area of the trigger object.

As a specific implementation of embodiments of the present disclosure, the trigger object is a hand.

As a specific implementation of embodiments of the present disclosure, the motion includes opening and closing, rotating, proximal-distal moving or gesture changing.

In a third aspect of the present disclosure, electric equipment is provided, which includes at least one processor and a memory in communication connection with the at least one processor. The memory storage instructions executable by the at least one processor, and the instructions, when being executed by the at least one processor, cause the at least one processor to execute any of the scene controlling methods according to the first aspect of the present disclosure.

In a fourth aspect of the present disclosure, a non-transitory computer readable storage medium is provided. The non-transitory computer readable storage medium stores computer instructions used to make a computer execute any of the scene controlling methods according to the first aspect of the present disclosure.

A scene controlling method, a scene controlling device, electronic equipment and non-transitory computer readable storage medium are provided according to embodiments of the present disclosure. In the scene controlling method, pre-determined scene information is retrieved according to a motion of a trigger object, so as to switch the scene or control some element of the scene. By associating the motions of the trigger object with the scenes, the scene displayed on the electronic equipment can be controlled without any hardware upgrade of the conventional electronic equipment, thereby reducing the cost.

The above description is merely an overview of technical solutions in the present disclosure. In order to make technique means of the present disclosure more clear so as to be implemented according to the present disclosure, and make the above and other purposes, features and advantages better understood, preferred embodiments are described in detail below in conjunction with drawings.

BRIEF DESCRIPTION OF THE DRAWINGS

In order to more clearly describe the technical solutions in the embodiments of the present disclosure, drawings to be used in the description of the embodiments of the present disclosure are briefly described hereinafter. It is apparent that the drawings described below merely show some embodiments of the present disclosure, and those skilled in the art may obtain other drawings according to the provided drawings without any creative effort.

DETAILED DESCRIPTION

Embodiments of the present disclosure are described in detail below in conjunction with the drawings.

It should be clear that embodiments of the present disclosure are described with specific examples hereinafter and those skilled in the art may easily learn about other advantages and uses of the present disclosure from details disclosed in the present specification. Apparently, embodiments described below are merely some, rather than all of embodiments according to the present disclosure. The present disclosure may be implemented or applied in other different embodiments. For different applications, details of the present specification may be modified or changed without departing from the spirit of the present disclosure.

It is noted that, embodiments below and features in the embodiments may be in combination with each other as long as there is no conflict.

Based on embodiments of the present disclosure, all other embodiments obtained by those skilled in the art without creative efforts belong to the scope of the present disclosure.

It is noted that, below describes various aspects of embodiments in the scope of the attached claims.

Apparently, the various aspects described herein may be implemented in various forms, and any specific structures and/or functions described herein are only illustrative. According to the present disclosure, those skilled in the art should know that any aspects described herein may be implemented independently from other aspects or may be implemented in combination with one or more other aspects in various ways. For example, devices and/or methods may be implemented by using any number of aspects of the present specification. In addition, other structures and/or functions than one or more aspects of the present disclosure may be used to implement the device and/or method.

It is noted that, the drawings provided in the following embodiments are merely used to schematically explain basic elements of the present disclosure. The drawings only show elements relating to the present disclosure and are not drawn according to actual number, shape and size of the elements. The shape, number and scale of each element in practical implementations may be changed arbitrarily and the configuration of the elements may be more complex.

Moreover, in the following description, specific details are provided for better understanding of the embodiments. However, those skilled in the art should know that the aspects of the present disclosure may be implemented without the specific details.

Figure 1:
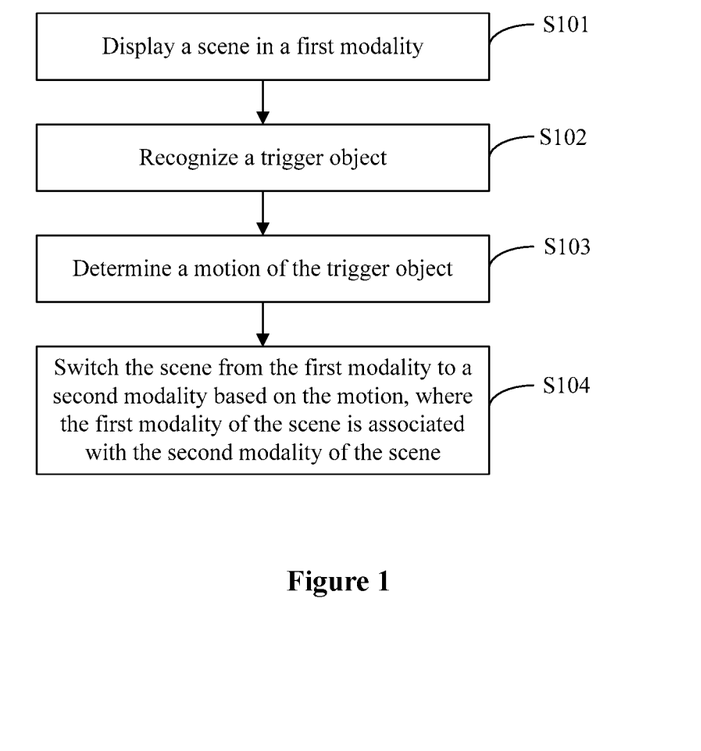
FIG. 1 is a flowchart of a scene controlling method according to an embodiment of the present disclosure.

Reference is made to FIG. 1, which is a flowchart of a scene controlling method according to an embodiment of the present disclosure. The scene controlling method includes the following steps S101 to S104.

In step S101, a scene in a first modality is displayed.

The first modality of the scene is the modality of the scene before switched. For example, in a specific application, the first modality of the scene may be a 2D scene displayed on a smart phone. The first modality of the scene may also be a 3D scene before the scene is switched. A trigger object is recognized and a motion of the trigger object is determined while the first modality of the scene is displayed.

In step S102, a trigger object is recognized.

Before controlling the scene, it is determined first whether an object in the scene is the trigger object. No response is made if the object in the scene is not the trigger object. Only in a case that the object in the scene is recognized to be the trigger object, it is determined whether the trigger object makes a motion and what is the motion. Then scene information is retrieved according to the motion.

In step S103, the motion of the trigger object is determined.

After recognizing the trigger object in step S102, it is determined whether the trigger object makes a predetermined motion. The motion of the trigger object is compare with stored motion data to determine the motion is the same as which one of motions included in the motion data.

In step S104, the scene is switched from the first modality to the second modality based on the motion, where the first modality of the scene is associated with the second modality of the scene.

After determining the motion in step S103, scene information corresponding to the motion is retrieved and displayed. Alternatively, new scene information is formed by combining the retrieved scene information and the current scene information, or some element of the current scene information is replaced with the retrieved scene information, or the current scene information is completely replaced with the retrieved scene information.

The scene is a pattern composed of various elements. Controlling the scene may include switching from one scene to another scene or controlling an element of the scene, for example, controlling proximal-distal movement of an object (such as a ball) in the scene.

In a specific application, the trigger object is a hand, and the motion of the trigger object includes various gestures such as opening and closing, rotating, proximal-distal moving or gesture changing. The change of the scene on the phone is controlled according to gestures.

At the beginning, a real-time image taken by a camera is displayed on the phone with background music. The real-time image with the background music is the first modality of the scene, which may be, for example, a scene with a 2D raining pattern. When the camera captures an opening hand, the hand is recognized first, and then it is determined whether the hand makes a motion of opening, i.e., a motion from a first to an opening palm. In a case of determining that the hand makes a motion of opening, the corresponding scene information, for example, raining information in a form of 3D particles, is retrieved. Then, the raining information and the currently displayed real-time image are combined to display a scene of raindrops in the form of 3D particles on the phone. The background music may be controlled according to a preset rule. For example, the original background music may be continued, or turned off or switched to another music matching with the raining scene. The scene of the 3D raindrop particles displayed on the phone is the second modality of the scene. The association between the second modality of the scene and the first modality of the scene is predetermined. When detecting the opening motion of the hand in the first modality of the scene, the corresponding information is retrieved to switch the scene from the first modality to the second modality.

In another specific application, a scene of blue sky and white clouds is displayed on the phone. When the phone determines that the image taken by the camera includes a hand, that is, when the phone recognizes the hand, it is determined whether the hand moves back and forth relative to the camera. If it is determined that the hand moves back and forth relative to the camera, the corresponding scene information is retrieved to make the clouds move with the motion of the hand. For example, the clouds move close to the screen as the hand moves close to the camera, and the clouds move far away from the screen as the hand moves far away from the camera. Alternatively, the clouds move far away from the screen as the hand moves close to the camera, and the clouds move close to screen as the hand moves far away from the camera. The scene before the moving of the white clouds is the first modality of the scene and the scene after the moving of the white clouds is the second modality of the scene. In the case that the moving of the hand is detected while the scene is in the first modality, the corresponding scene information is retrieved to switch the scene from the first modality to the second modality.

In above two specific applications, the mobile phone is described only as an example for better understanding of the embodiments of the present disclosure. The present disclosure is not limited to the mobile phone. That is, electronic equipment with information processing functions, such as a tablet computer and a laptop can also be used to implement the technical solutions of the present disclosure. It is only illustrative to describe the trigger object as the hand in the above applications. The trigger object is not limited to a hand. For example, the trigger object may be a head, an arm, a leg, and the like. The motion may be shaking head or winking, and the like.

Figure 2:
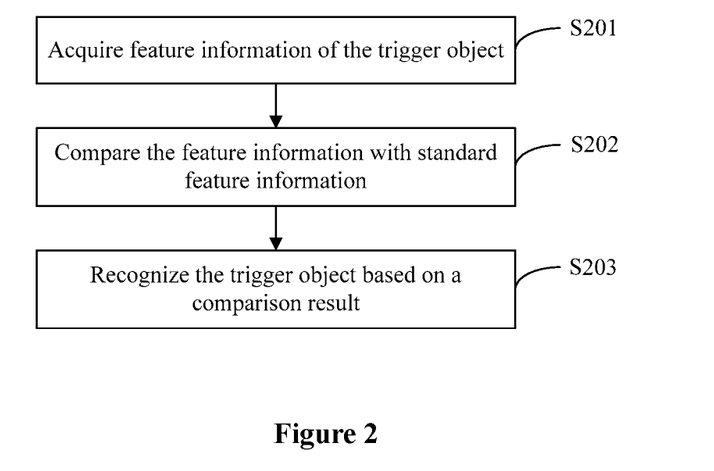
FIG. 2 is a flowchart of a process of recognizing a trigger object according to an embodiment of the present disclosure.

As a specific implementation of embodiments of the present disclosure, the trigger object is recognized in step S102 by the following steps S201 to S203, as shown in FIG. 2.

In step S201, feature information of the trigger object is acquired.

The feature information of the object is the information characterizing the object, such as profile information, key point information of the image of the object. Since the technology for extracting profile information and key point information of an image is well-known conventional technology, it is not described herein.

In step S202, the feature information is compared with standard feature information.

After acquiring the feature information in step S201, the acquired feature information is compared with pre-stored feature information.

In step S203, the trigger object is recognized based on a comparison result.

In the example of using a hand, after acquiring the image, the profile information or key point information of the image are acquired, and then compared with pre-stored profile information or key point information of a hand. If the comparison result indicates that they conform to each other, the acquired image is determined as an image of a hand, that is, the trigger object is recognized.

In practices, because different users have different profile information or key point information of hands, various profile information or key point information of different sizes of hands are stored in advance. The acquired profile information or key point information is compared with each piece of pre-stored profile information or key point information of hands. The acquired image is recognized as an image of hand as long as the acquired information conforms to one piece of the pre-stored information of hands.

As a specific implementation of the embodiment of the present disclosure, the feature information of the trigger object is acquired specifically by acquiring key points of the trigger object.

Figure 3:
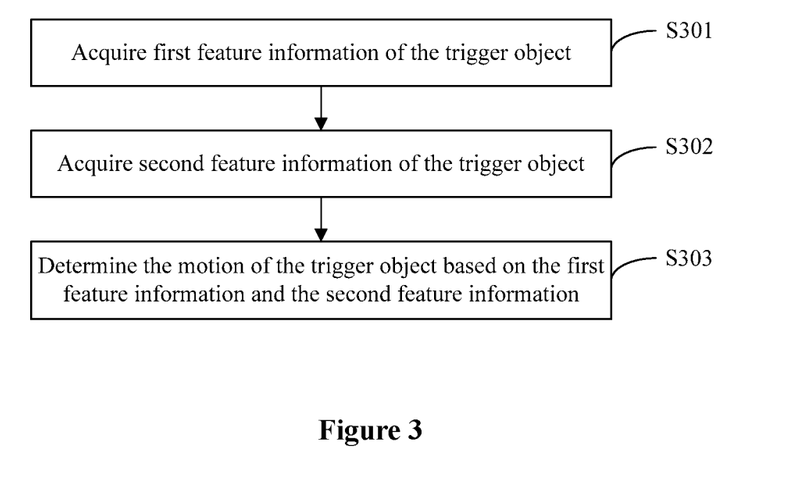
FIG. 3 is a flowchart of a process of determining a motion of a trigger object according to an embodiment of the present disclosure.

As a specific implementation of the embodiment of the present disclosure, the motion of the trigger object is determined in step S103 by the following steps S301 to S303, as shown in FIG. 3.

In step S301, first feature information of the trigger object is acquired.

In step S302, second feature information of the trigger object is acquired.

In step S303, the motion of the trigger object is determined based on the first feature information and the second feature information.

In this example, the key points are used as the feature information. In the application scenario of human hands, for determining the motion of the hand changing from a first to an opening palm, it is required to acquire key points of the first and then acquire key points of the opening palm. After that, the key points of the first are compared with the pre-stored key points of hands to determine that the hand is in a state of a fist, and the key points of the opening palm are compared with the pre-stored key points of hands to determine that the hand is in a state of an opening palm, so as to determine that the hand makes a motion of opening.

As a specific implementation of the embodiment of the present disclosure, the motion of the trigger object is determined in step S103 by acquiring an area of the trigger object and determining the motion of the trigger object based on the area.

Figure 4:
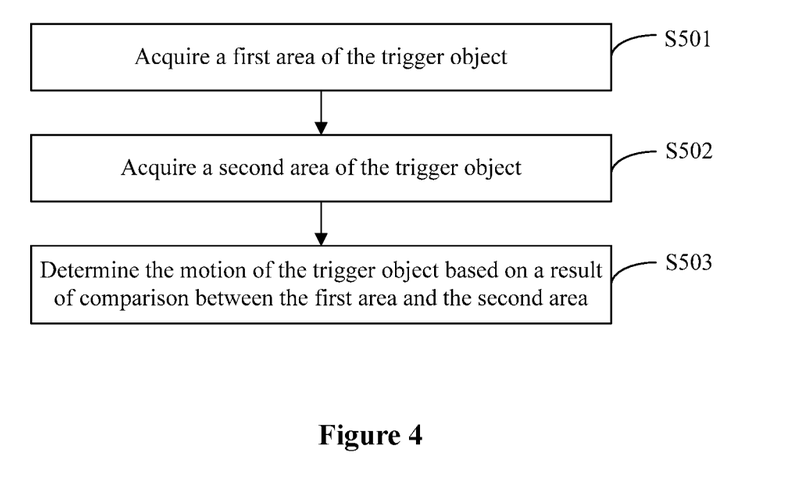
FIG. 4 is a flowchart of a process of determining a motion of a trigger object based on an area according to an embodiment of the present disclosure.

As shown in FIG. 4, the determining the motion of the trigger object based on the area includes the following steps S401 to S403.

In step S401, a first area of the trigger object is acquired.

In step S402, a second area of the trigger object is acquired.

In step S403, the motion of the trigger object is determined based on a result of comparison between the first area and the second area.

Still taking the motion of the hand from a first to an opening palm as an example, after acquiring the image of the hand, the area of the hand making a first is acquired, and then the area of the hand opening the palm is acquired. Then, the area of the hand making a first is compared with the pre-stored areas of hands to determine that the hand is in a state of fist, and the area of the hand opening the palm is compared with the pre-stored areas of hands to determine that the hand is in a state of opening, so as to determine that the hand makes a motion of opening. In determining the proximal-distal movement of a hand relative to a mobile phone, with unchanged parameter settings of a camera of the mobile phone, the area of the hand in the image becomes smaller as the hand moves farther away from the mobile phone, and the area of the hand in the image becomes larger as the hand moves closer to the mobile phone. Therefore, the motion of the hand relative to the mobile phone can be easily determined by calculating the area of the hand.

Since the shape of the hand is not regular, it is complex to calculate the area of the hand directly. Therefore, as a specific implementation of the embodiment of the present disclosure, the area of the trigger object is acquired specifically by determining a smallest regular box fully containing the trigger object and calculating the area of the smallest regular box to obtain the area of the trigger object.

Figure 5:
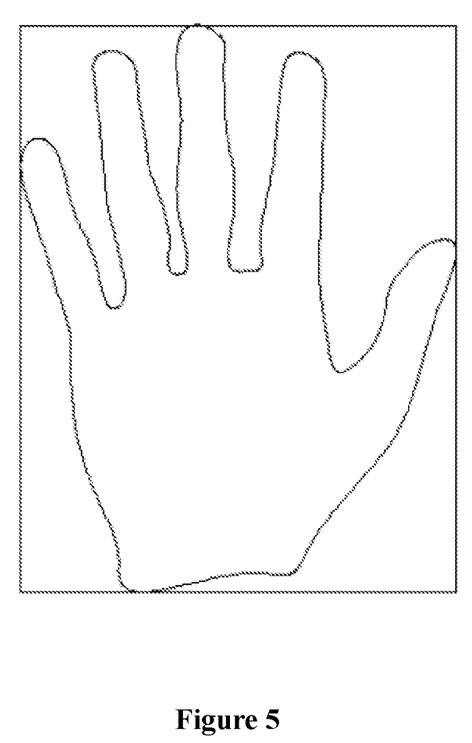
FIG. 5 is a schematic diagram showing determining a smallest regular box according to an embodiment of the present disclosure.

As shown in FIG. 5, the hand is right wrapped in a determined regular rectangle. The computation is simplified by calculating the area of the rectangle, instead of the area of the hand.

With the determined regular rectangle according to the present disclosure, not only the area of the hand can be replaced by the area of the rectangle, but also the movement of an element of the scene can be associated with a side length of the rectangle. For example, when the hand moves forward and backward relative to the mobile phone, the movement distance of the hand may be associated with a side length of the rectangle, such that the movement trail of the clouds can be controlled based on the side length of the rectangle. Since the side length varies in a linear manner without a sudden change, the movement of the clouds is smooth without a jumping move.

Figure 6:
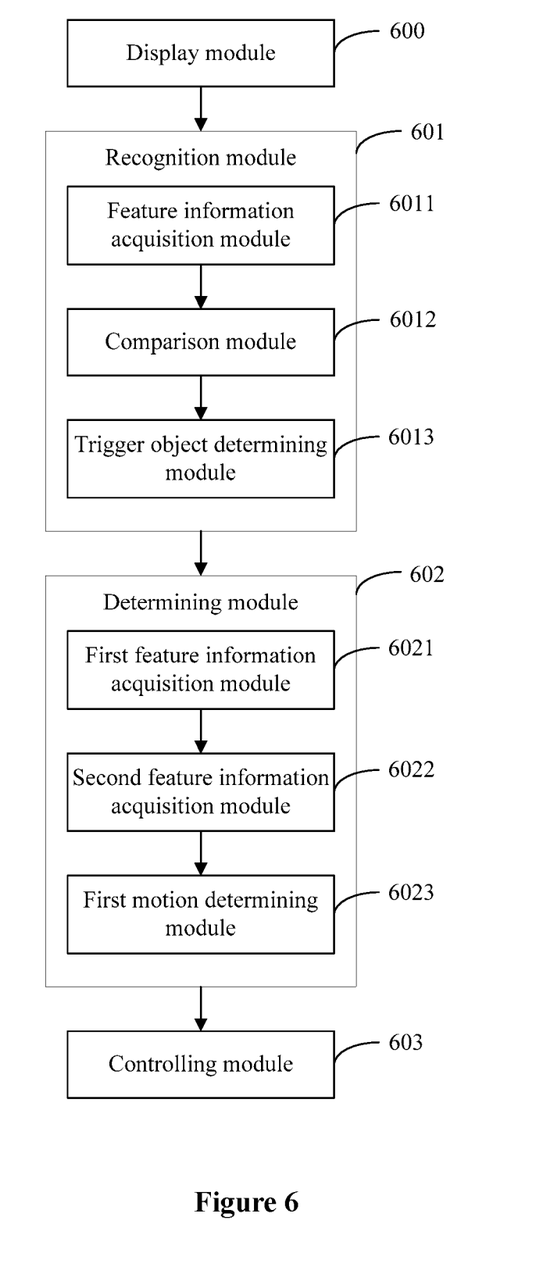
FIG. 6 is a block diagram showing principle of a scene controlling device according to an embodiment of the present disclosure.

As FIG. 6 shows, a scene controlling device according to an embodiment of the present disclosure includes a display module 600, a recognition module 601, a determining module 602 and a controlling module 603.

The display module 600 is configured to display a scene in a first modality. The recognition module 601 is configured to recognize a trigger object. The determining module 602 is configured to determine a motion of the trigger object. The controlling module 603 is configured to switch the scene from the first modality to a second modality based on the motion of the trigger object, where the first modality of the scene is associated with the second modality of the scene.

As a specific implementation of embodiments of the present disclosure, the recognition module 601 includes a feature information acquisition module 6011 configured to acquire feature information of the trigger object, a comparison module 6012 configured to compare the feature information with standard feature information, and a trigger object determining module 6013 configured to recognize the trigger object according to a comparison result.

As a specific implementation of embodiments of the present disclosure, the feature information of the trigger object is acquired by acquiring key points of the trigger object.

As a specific implementation of embodiments of the present disclosure, the determining module 602 includes a first feature information acquisition module 6021, a second feature information acquisition module 6022 and a first motion determining module 6023. The first feature information acquisition module 6021 is configured to acquire first feature information of the trigger object. The second feature information acquisition module 6022 is configured to acquire second feature information of the trigger object. The first motion determining module 6023 is configured to determine the motion of the trigger object based on the first feature information and the second feature information.

As a specific implementation of embodiments of the present disclosure, the determining module 602 includes an area acquisition module configured to acquire an area of the trigger object.

As a specific implementation of embodiments of the present disclosure, the determining module 602 includes a first area acquisition module, a second area acquisition module and a second motion determining module. The first area acquisition module is configured to acquire a first area of the trigger object. The second area acquisition module is configured to acquire a second area of the trigger object. The second motion determining module is configured to determine the motion of the trigger object based on a result of comparison between the first area and the second area.

As a specific implementation of embodiments of the present disclosure, the area acquisition module includes a regular box determining module and an area calculating module. The regular box determining module is configured to determine a smallest regular box fully containing the trigger object. The area calculating module is configured to calculate an area of the smallest regular box to obtain the area of the trigger object.

As a specific implementation of embodiments of the present disclosure, the trigger object is a hand.

As a specific implementation of embodiments of the present disclosure, the motion includes opening and closing, rotating, proximal-distal moving, or gesture changing.

Figure 7:
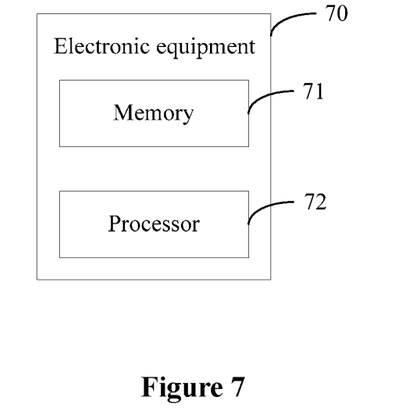
FIG. 7 is a block diagram showing principle of an electronic equipment according to an embodiment of the present disclosure.

FIG. 7 is a hardware block diagram of electronic equipment according to an embodiment of the present disclosure. As shown in FIG. 7, the electronic equipment 70 according to an embodiment of the present disclosure includes a memory 71 and a processor 72.

The memory 71 is configured to store non-transitory computer readable instructions. Specifically, the memory 71 may include one or more computer program products. The computer program products may include various forms of computer readable storage medium, such as a volatile memory and a nonvolatile memory. The volatile memory may include a random access memory (RAM) and/or a cache memory (cache), and the like. The nonvolatile memory may include a read-only memory (ROM), a hard disk, a flash memory, and the like.

The processor 72 may be a central processing unit (CPU) or another type of processing unit with data processing capacity and/or instruction execution capacity. The processor 72 can control other modules in the electronic equipment 70 to execute desired functions. In an embodiment of the present disclosure, the processor 72 is configured to execute the computer readable instructions stored in the memory 71 to control the electronic equipment 70 to execute some or all steps of the scene controlling methods according to aforementioned embodiments of the present disclosure.

Those skilled in the art should understand that well-known structures such as a communication bus and an interface may be included in some embodiments to provide good user experience and the well-known structures also fall within the scope of the present disclosure.

For a detailed description of the present embodiment, one may refer to relevant descriptions of the aforementioned embodiments, which are not repeated herein.

Figure 8:
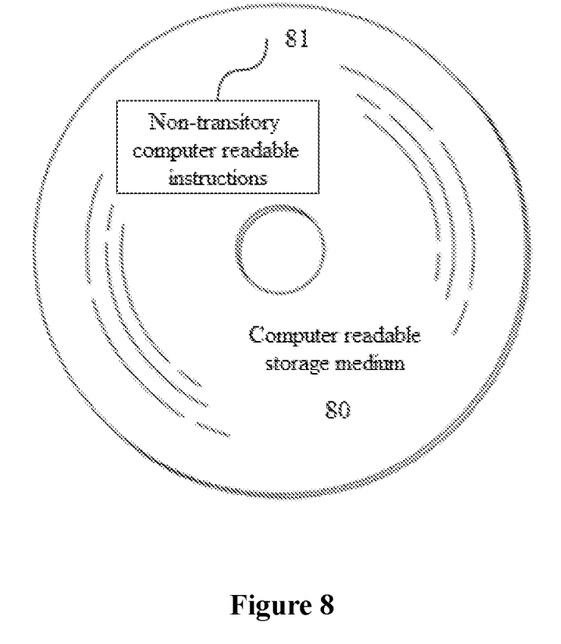
FIG. 8 is a schematic diagram showing an non-transitory computer readable storage medium according to an embodiment of the present disclosure.

FIG. 8 is a schematic diagram showing the computer readable storage medium according to an embodiment of the present disclosure. As shown in FIG. 8, non-transitory computer readable instructions 81 are stored in a computer readable storage medium 80 according to an embodiment of the present disclosure. Some or all steps of the scene controlling methods according to aforementioned embodiments of the present disclosure are executed when the non-transitory computer readable instructions 81 are executed by the processor.

The computer readable storage medium 80 includes but is not limited to an optical storage medium (such as CD-ROM and DVD), a magneto-optical storage medium (such as MO), a magnetic storage medium (such as a tape and a movable hard disk), a medium with an inbuilt rewritable nonvolatile memory (such as a memory card), and a medium with an inbuilt ROM (such as a ROM box).

For a detailed description of the present embodiment, one may refer to relevant descriptions of the aforementioned embodiments, which are not repeated herein.

Figure 9:
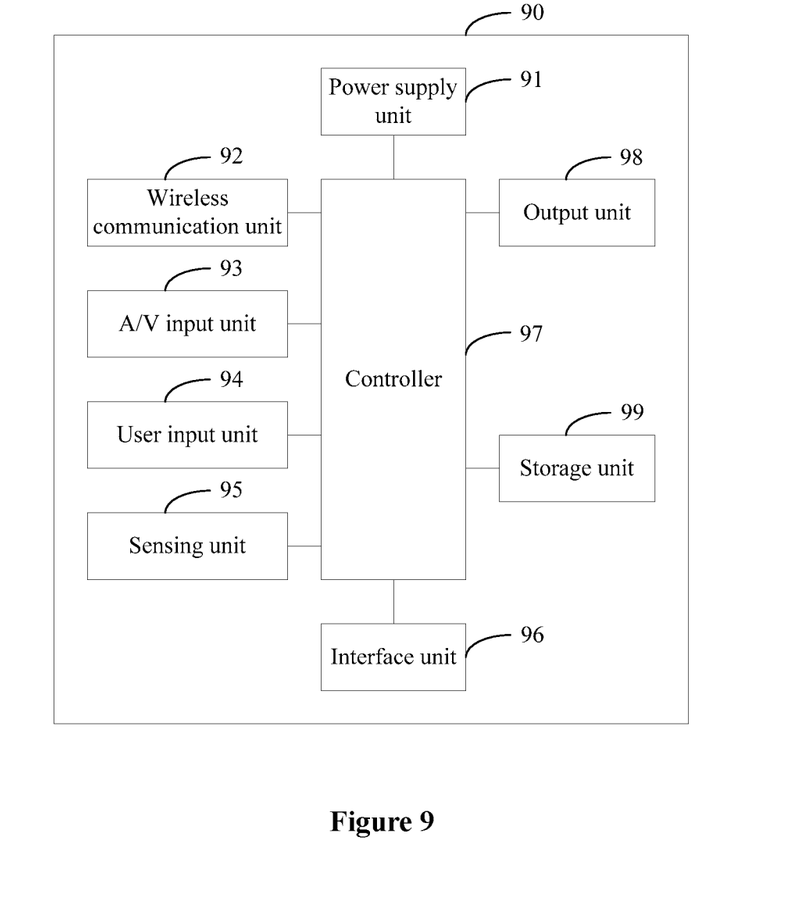
FIG. 9 is a block diagram showing principle of a terminal according to an embodiment of the present disclosure.

FIG. 9 is a schematic hardware structural diagram of a terminal device according to an embodiment of the present disclosure. As shown in FIG. 9, the terminal 90 includes the scene controlling device according to the above embodiments.

The terminal device may be implemented in various forms. The terminal device according to the present disclosure includes but is not limited to mobile terminal devices such as a mobile phone, a smart phone, a laptop computer, a digital broadcast receiver, a PDA (personal digital assistant), a PAD (tablet computer), a PMP (Portable Multimedia Player), a navigation device, a vehicle terminal device, a vehicle display terminal, and a vehicle electronic rearview mirror, and fixed terminal devices such as a digital TV and a desk computer.

As alternatives of the above embodiments, the terminal 90 may also include other elements. As shown in FIG. 9, the terminal 90 may include a power supply unit 91, a wireless communication unit 92, an A/V (audio/video) input unit 93, a user input unit 94, a sensing unit 95, an interface unit 96, a controller 97, an output unit 98, a storage unit 99, and the like. FIG. 9 shows a terminal with various modules, but it should be understood that not all shown modules are necessary, and more or less modules may be implemented alternatively.

The wireless communication unit 92 allows wireless communication between the terminal 90 and a wireless communication system or a wireless communication network. The A/V input unit 93 is configured to receive an audio signal or a video signal. The user input unit 94 may generate key input data based on a command inputted by a user, to control various operations of the terminal device. The sensing unit 95 is configured to detect a current state of the terminal 90, a location of the terminal 90, presentence of a touch input of a user to the terminal 90, the orientation of the terminal 90, accelerated or decelerated movement of the terminal 90, and a direction of movement of the terminal 90, to generate a command or a signal for controlling the operation of the terminal 90. The interface unit 96 is configured to connect at least one external device to the terminal 90. The output unit 98 is configured to output a signal in a visual, audio and/or tactile way. The storage unit 99 may store software programs of processes and controlling operations executed by the controller 97. The storage unit 99 may also temporarily store data to be outputted or data already outputted. The storage unit 99 may include at least one type of storage medium. Furthermore, the terminal 90 may collaborate with network memory device having the storage function of the storage unit 99 via a network connection. The controller 97 usually controls overall operations of the terminal device. In addition, the controller 97 may include a multimedia module configured to reproduce or playback multimedia data. The controller 97 may execute pattern recognition processing to recognize handwriting input or picture drawing input on a touch screen as a character or an image. Under the control of the controller 97, the power supply unit 91 receives external electric power or internal electric power and provides proper electric power required for operating various elements and modules.

The embodiments of scene controlling according to the present disclosure may be implemented by computer software, computer hardware or any combination thereof in a form of computer readable medium. For hardware implementation, the embodiments of scene controlling according to the present disclosure may be implemented by one of an application specific integrated circuit (ASIC), a digital signal processor (DSP), a digital signal processing device (DSPD), a programmable logic device (PLD), a field programmable gate array (FPGA), a processor, a controller, a microcontroller, and a microprocessor which are designed to execute at least one of functional electronic units described above. In some cases, the embodiments of scene controlling according to the present disclosure may be implemented by the controller 97. For software implement, the embodiments of scene controlling according to the present disclosure may be implemented by individual software module designed to execute at least one function or operation. Software code may be implemented by software application programs (or programs) written in any proper program language. The software code may be stored in the storage unit 99 and executed by the controller 97.

For a detailed description of the present embodiment, one may refer to relevant descriptions of the aforementioned embodiments, which are not repeated herein.

General principles of the present disclosure are described in conjunction with specific embodiments. However, it should be noted that advantages, superiorities and effects mentioned in the present disclosure are only examples rather than restrictions. Each embodiment of the present disclosure may not necessarily have the advantages, superiorities and effects. In addition, specific details disclosed above are not restrictive but merely exemplary and illustrative for better understanding. The present disclosure is not limited to the above specific details.

In the present disclosure, relational terms such as "first" and "second" are merely used to distinguish one entity or operation from another entity or operation, but do not indicate or imply an actual relationship or order of these entities or operations. Block diagrams of devices, apparatuses, equipment, and systems according to the present disclosure are merely examples, which do not indicate or imply that connections, arrangements and configurations must be in the way shown in the block diagrams. As understood by those skilled in the art, these devices, apparatuses, equipment, and systems may be connected, arranged and configured in any way. Words such as "include", "comprise", "have", and the like are inclusive, which indicate "including but not limited to" and may be used interchangeably. Words "or" and "and" herein refer to "and/or", and may be used interchangeably, unless it is explicitly indicated otherwise by the context. Words "such as" refers to "such as but not limited to", which may be used interchangeably.

Besides, when the word "or" is used to connect listed elements after the phrase "at least one", it indicates all possible combinations. For example, "at least one of A, B or C" means A or B or C, or AB or AC or BC, or ABC (i.e., A and B and C). Furthermore, expression "example" doesn't mean that the described example is preferable or better than other examples.

It is noted that various units and various steps in the systems and methods of the present disclosure may be decomposed and/or recombined. These decomposition and recombination should be regarded as equivalent technical solutions of the present disclosure.

Variations, replacements and changes may be made to the described technical solutions without departing from the technical scope defined by the attached claims. In addition, the scope of the claims of the present disclosure is not limited to specific details of components, means, methods and actions of the above processes, machines, manufactures and events. One may use components, means, methods and actions of processes, machines, manufactures and events that have similar functions or achieve similar effects as those described above. Therefore, the attached claims cover such components, means, methods and actions of the processes, machines, manufactures and events in the scope.

The above description of the technical solutions of the present disclosure is provided to make those skilled in the art can implement or use the technical solutions. Various modifications on these aspects are apparent for those skilled in the art. General principles defined herein may be applied to other aspects without departing from the scope of the present disclosure. Therefore, the present disclosure is not limited to the embodiments described herein, but should comply with the widest scope consistent with the principles and novel features disclosed herein.

The above description is provided for illustration, rather than limiting embodiments of the technical solutions to the disclosed embodiments. Although multiple examples and embodiments are discussed above, those skilled in the art may make some variations, modifications, changes, additions and sub-combinations.

The invention claimed is:

1. A scene controlling method, comprising:
   displaying a scene in a first mode, wherein the scene comprises at least one element in an image captured by a camera, and wherein the at least one element in the image is different from a trigger object to be captured and recognized;
   recognizing that an object captured by the camera is the trigger object, wherein the trigger object is a human body part;
   determining a motion of the trigger object, wherein the determining a motion of the trigger object further comprises:
      acquiring first feature information of the trigger object,
      acquiring second feature information of the trigger object,
      wherein the first feature information and the second feature information of the trigger object characterize different states of the human body part, respectively;
      acquiring a first area of the trigger object,
      acquiring a second area of the trigger object,
      wherein an area of the trigger object is computed based on determining a smallest rectangle fully containing the trigger object, and determining the motion of the trigger object based on the first feature information, the second feature information, and a result of comparison between the first area and the second area;
retrieving scene information based on the motion of the trigger object, wherein the scene information is associated with the at least one element of the scene;
generating a second mode of the scene based at least in part on the retrieved scene information, wherein the generating a second mode of the scene based at least in part on the retrieved scene information further comprises displaying the at least one element in a three-dimensional form or adding a motion to the at least one element; and
switching the scene from the first mode to the second mode, wherein the first mode of the scene is associated with the second mode of the scene.

2. The scene controlling method according to claim 1, wherein the recognizing a trigger object comprises:
acquiring feature information of the trigger object;
comparing the feature information with standard feature information; and
recognizing the trigger object based on a comparison result.

3. The scene controlling method according to claim 2, wherein the acquiring feature information of the trigger object comprises:
acquiring key points of the trigger object.

4. The scene controlling method according to claim 1, wherein the trigger object is a hand.

5. The scene controlling method according to claim 4, wherein the motion comprises opening and closing, rotating, proximal-distal moving, or gesture changing.

6. An electronic equipment, comprising:
at least one processor; and
a memory in communication connection with the at least one processor, wherein the memory stores instructions executable by the at least one processor, and the instructions, when being executed by the at least one processor, cause the at least one processor to execute operations of:
displaying a scene in a first mode, wherein the scene comprises at least one element in an image captured by a camera, and wherein the at least one element in the image is different from a trigger object to be captured and recognized;
recognizing that an object captured by the camera is the trigger object, wherein the trigger object is a human body part;
determining a motion of the trigger object, wherein the determining a motion of the trigger object further comprises:
acquiring first feature information of the trigger object,
acquiring second feature information of the trigger object,
wherein the first feature information and the second feature information of the trigger object characterize different states of the human body part, respectively;
acquiring a first area of the trigger object,
acquiring a second area of the trigger object,
wherein an area of the trigger object is computed based on determining a smallest rectangle fully containing the trigger object, and
determining the motion of the trigger object based on the first feature information, the second feature information, and a result of comparison between the first area and the second area;
retrieving scene information based on the motion of the trigger object, wherein the scene information is associated with the at least one element of the scene;
generating a second mode of the scene based at least in part on the retrieved scene information, wherein the generating a second mode of the scene based at least in part on the retrieved scene information further comprises displaying the at least one element in a three-dimensional form or adding a motion to the at least one element; and
switching the scene from the first mode to the second mode, wherein the first mode of the scene is associated with the second mode of the scene.

7. The electronic equipment according to claim 6, wherein the recognizing a trigger object comprises:
acquiring feature information of the trigger object;
comparing the feature information with standard feature information; and
recognizing the trigger object based on a comparison result.

8. The electronic equipment according to claim 7, wherein the acquiring feature information of the trigger object comprises:
acquiring key points of the trigger object.

9. The electronic equipment according to claim 6, wherein the trigger object is a hand.

10. The electronic equipment according to claim 9, wherein the motion comprises opening and closing, rotating, proximal-distal moving, or gesture changing.

11. A non-transitory computer readable storage medium, wherein the non-transitory computer readable storage medium stores computer instructions used to make a computer execute operations comprising:
displaying a scene in a first mode, wherein the scene comprises at least one element in an image captured by a camera, and wherein the at least one element in the image is different from a trigger object to be captured and recognized;
recognizing that an object captured by the camera is the trigger object, wherein the trigger object is a human body part;
determining a motion of the trigger object, wherein the determining a motion of the trigger object further comprises:
acquiring first feature information of the trigger object,
acquiring second feature information of the trigger object,
wherein the first feature information and the second feature information of the trigger object characterize different states of the human body part, respectively;
acquiring a first area of the trigger object,
acquiring a second area of the trigger object,
wherein an area of the trigger object is computed based on determining a smallest rectangle fully containing the trigger object, and
determining the motion of the trigger object based on the first feature information, the second feature information, and a result of comparison between the first area and the second area;
retrieving scene information based on the motion of the trigger object, wherein the scene information is associated with the at least one element of the scene;
generating a second mode of the scene based at least in part on the retrieved scene information, wherein the generating a second mode of the scene based at least in part on the retrieved scene information further comprises displaying the at least one element in a three-dimensional form or adding a motion to the at least one element; and switching the scene from the first mode to the second mode, wherein the first mode of the scene is associated with the second mode of the scene.

\* \* \* \* \*